United States Patent
Pope et al.

(10) Patent No.: US 12,385,374 B2
(45) Date of Patent: Aug. 12, 2025

(54) METHODS AND SYSTEMS FOR GREENHOUSE GAS CAPTURE AND SEQUESTRATION

(71) Applicant: CARBON GEOCYCLE, INC., Laramie, WY (US)

(72) Inventors: John Pope, Laramie, WY (US); Wade A. Bard, Laramie, WY (US)

(73) Assignee: CARBON GEOCYCLE, INC., Laramie, WY (US)

( * ) Notice: Subject to any disclaimer, the term of this patent is extended or adjusted under 35 U.S.C. 154(b) by 219 days.

(21) Appl. No.: 17/886,814

(22) Filed: Aug. 12, 2022

(65) Prior Publication Data

US 2022/0381122 A1 Dec. 1, 2022

Related U.S. Application Data

(63) Continuation-in-part of application No. PCT/US2021/021366, filed on Mar. 8, 2021.

(60) Provisional application No. 62/987,178, filed on Mar. 9, 2020.

(51) Int. Cl.
| | |
|---|---|
| E21B 43/16 | (2006.01) |
| E21B 43/00 | (2006.01) |
| E21B 47/08 | (2012.01) |
| E21B 47/12 | (2012.01) |
| E21B 47/26 | (2012.01) |

(52) U.S. Cl.
CPC .......... *E21B 43/164* (2013.01); *E21B 43/006* (2013.01); *E21B 47/08* (2013.01); *E21B 47/12* (2013.01); *E21B 47/26* (2020.05)

(58) Field of Classification Search
CPC .............................. E21B 43/164; E21B 43/006
USPC ......................................................... 166/402
See application file for complete search history.

(56) References Cited

U.S. PATENT DOCUMENTS

| | | | |
|---|---|---|---|
| 8,460,444 B2 * | 6/2013 | Zhang | B01D 53/1437 96/365 |
| 9,869,167 B2 * | 1/2018 | Randolph | F03G 4/026 |
| 2007/0261844 A1 * | 11/2007 | Cogliandro | E21B 43/164 166/266 |
| 2012/0038174 A1 * | 2/2012 | Bryant | H02K 7/18 165/45 |
| 2013/0043678 A1 * | 2/2013 | Saar | F02C 1/10 165/45 |

\* cited by examiner

Primary Examiner — William D Hutton, Jr.
Assistant Examiner — Ashish K Varma
(74) Attorney, Agent, or Firm — Pierson IP, PLLC

(57) ABSTRACT

Injecting CO2 that is diluted within water, into a coal seam, which allows for the sequestering and control of downhole CO2 within connected fractures without damaging the subterranean formation.

16 Claims, 8 Drawing Sheets

METHODS AND SYSTEMS FOR GREENHOUSE GAS CAPTURE AND SEQUESTRATION

TECHNICAL FIELD/FIELD OF THE DISCLOSURE

The present disclosure relates to greenhouse gas capture and sequestration in a subterranean formation. More specifically, embodiments are directed towards injecting $CO_2$ that is diluted within water, into a coal seam, which allows for the sequestering and control of downhole $CO_2$ within connected fractures and pores without damaging the subterranean formation.

BACKGROUND OF THE DISCLOSURE

Greenhouse gases, such as carbon dioxide, methane, nitrous oxide and ozone have increased in concentration in the atmosphere. Various methods of point source and non-point source capture of greenhouse gases have been proposed but have traditionally not been economically viable. In traditional processes, the greenhouse gases are captured, condensed, and then injected into an underground formation or the deep ocean. Condensation of greenhouse gases is energy and capital intensive.

Conventional methods to sequester $CO_2$ into downhole coal formations include injecting pure $CO_2$ into coal seams. This overloads the coal seams, causes the downhole coal to swell, and subsequently lose connectivity. This damages the formation downhole, and does not allow for further sequestering of the $CO_2$.

Accordingly, needs exist for systems and methods injecting $CO_2$ that is diluted within water, or other incompressible fluid or gas, into the coal seam, which allows for the sequestering and control of downhole $CO_2$ within connected fractures without swelling the coal seam, wherein the water acts and coal acts as filters for dissolved mixed gasses within the water.

SUMMARY

One embodiment of the present disclosure is directed to a method. The method includes absorbing or adsorbing $CO_2$ gas into water to form a $CO_2$ solution gas mixture stream, wherein the $CO_2$ gas may be directly captured by the water from atmospheric air, and injecting the $CO_2$ solution gas mixture stream into a wellbore into a gas sequestration medium.

In embodiments, the $CO_2$ solution gas mixture stream may be injected into fractures with a coal seam. Responsive to the $CO_2$ solution gas mixture stream entering the coal seam, portions of the dissolved $CO_2$ within the solution gas mixture stream may be adsorbed or absorbed by the coal seam. This may move methane embedded within the coal seam away from an injector or a face of the coal seam towards a collector. The composition of the subterranean formation along a pressure gradient may be controlled based on the concentration of the $CO_2$ within the solution gas mixture stream and a rate of injection of the $CO_2$ solution gas mixture stream into the coal seam, which will change an amount of $CO_2$ within the coal seam.

BRIEF DESCRIPTION OF THE DRAWINGS

The present disclosure is best understood from the following description read with the accompanying figures. Various features are not drawn to scale. Dimensions of features may be arbitrarily increased or reduced for clarity of discussion.

DETAILED DESCRIPTION

Figure 1:
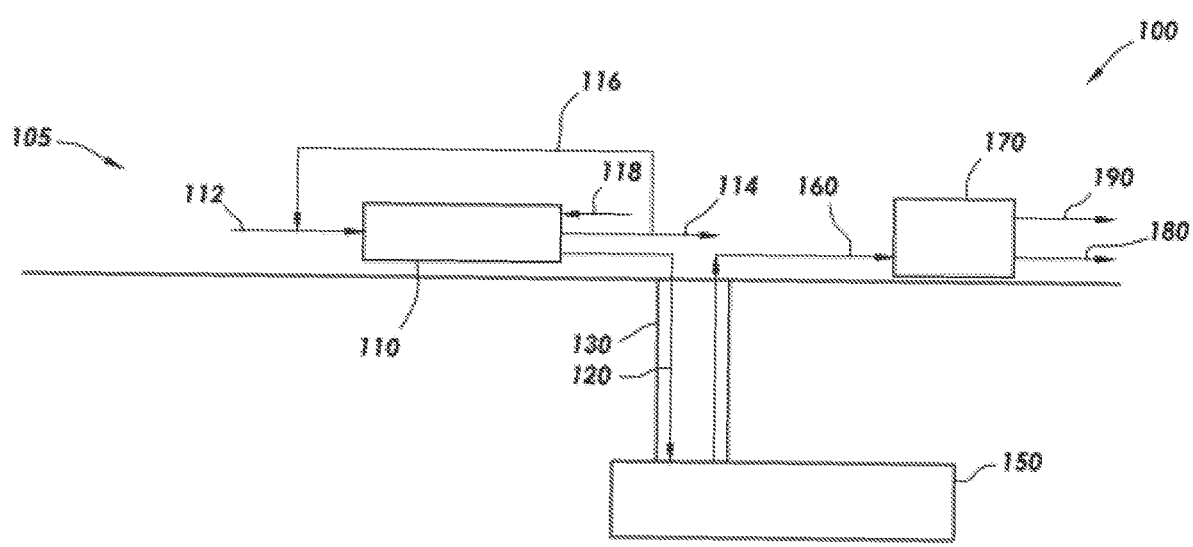
FIG. 1 is a block diagram representation of a greenhouse gas sequestration system consistent with at least one embodiment of the present disclosure.

The following disclosure provides many different examples for implementing different features of various embodiments. Specific examples of components and arrangements are described to simplify the disclosure. These examples are not limiting. The disclosure may repeat reference numerals or letters in the examples. This repetition is for simplicity and clarity and does not dictate a relationship between the embodiments or configurations.

FIG. 1 depicts an embodiment of greenhouse gas sequestration system 100 consistent with certain embodiments of the present disclosure. Greenhouse gas sequestration system 100 may include greenhouse gas capture system 105 and greenhouse gas sequestration medium 150.

In greenhouse gas capture system 105, $CO_2$ gas stream 112 is captured by flowing $CO_2$ gas stream 112 through water in capture vessel 110. In certain embodiments, capture vessel 110 is an absorber or adsorber. In other embodiments, capture vessel 110 is a reactor. In certain embodiments, capture vessel 110 may include a device to maximize the surface area between the $CO_2$ and the capture vessel 110, such as a bubble stone. $CO_2$ gas stream 112 may consist primarily of $CO_2$ or may be a mixture of $CO_2$ and other gases. $CO_2$ gas stream 112 may be sourced from a point source, such as a boiler, incinerator, or other device that emits a discharge stream containing $CO_2$, or a non-point source, such as the atmosphere. Capture vessel 110 may capture a portion of the $CO_2$ in $CO_2$ gas stream 112, discharging the remainder in discharge gas stream 114. In certain embodiments, at least a portion of discharge gas stream 114 may be recycled in recycle stream 116 to form a portion of $CO_2$ gas stream 112. In certain embodiments, $CO_2$ gas stream 112 is not condensed.

Water stream 118 may be introduced into capture vessel 110. Water in water stream 118 may be sourced from, for example and without limitation, ocean water, fresh water, produced water, such as water produced from an underground formation. In certain embodiments, the water in water stream 118 may include absorbed $CO_2$.

In certain embodiments, $CO_2$ from $CO_2$ gas stream 112 may be adsorbed/absorbed into the water in water stream 118. Water stream 118 may also be configured to directly capture the $CO_2$ from atmospheric air. Water stream 118 may be configured to act as a filter, wherein the liquid within water stream 118 initially absorbs the $CO_2$ from $CO_2$ gas stream 112 before other gases, such as nitrogen, oxygen, etc. As such, nitrogen and other gases may occupy a head space for recollection. In other embodiments, in addition to adsorption/absorption, the $CO_2$ gas from $CO_2$ gas stream 112 may be chemically reacted in capture vessel 110 to form a solution of water and $CO_2$ and salt forms of $CO_2$. Embodiments of the water stream 118 may include Nano bubbles, wherein the Nano bubbles are configured to further increase the surface area between $CO_2$ and the water stream 118, which may also decrease the dissolution rate of the $CO_2$ within the water stream 118, or to decrease or eliminate the buoyancy of the $CO_2$ bubbles, or to increase the amount of $CO_2$ that can be held by the water steam 118. The Nano bubbles within the water stream 118 may be between tens and hundreds of nanometers in size. Adsorption/absorption coupled with chemical reaction in water in capture vessel 110 may avoid the concentration and regeneration steps required for other methods that result in high energy use and associated costs. Further, adsorption/absorption coupled with chemical reaction in water in capture vessel 110 avoids the energy intensive $CO_2$ separation process from other gases used in other methods. When gases other than $CO_2$ are present in $CO_2$ gas stream 112, so long as those gases do not significantly interfere with the capture process or the ad/absorption of the sequestration process (described below), those gases do not negatively impact greenhouse gas sequestration system 100. In addition, formation of a solution of water and $CO_2$ or a solution of water and $CO_2$ and salt forms of $CO_2$ provides a mixture that is suitable for subsurface sequestration.

In some embodiments, the temperature of water stream 118 may be decreased prior to entry of water stream 118 to capture vessel 110. As solubility of $CO_2$ in water depends on temperature, a decrease in temperature of water stream 118 will therefore increase adsorption/absorption of $CO_2$ in capture vessel 110. Additives, including, but not limited to alcohols, to water stream 118 may further increase solubility of the $CO_2$ or its salt forms in the solution.

In certain embodiments, $CO_2$ gas stream 112 may be flowed through capture vessel 110 at a low head pressure, such as less than 1000 psia, less than 100 psia, less than 10 psia, or less than 1 psia. The low head pressure reduces the energy required to push the gas stream as compared to high inlet pressure options, allowing higher gas flow rates at lower energy cost. In some embodiments, $CO_2$ gas stream 112 may be pre-concentrated in $CO_2$ prior to entry into capture vessel 110, such as by, for example scrubbing the gas stream to remove nitrogen, oxygen; or other gases from $CO_2$ gas stream 112. Such pre-concentration has the effect of using less gas flow and energy to capture the $CO_2$.

In certain embodiments, water stream 118 may include a base such as, for example and without limitation, NaOH or KOH. In other embodiments, the base chemical is injected separately from water stream 118 into capture vessel 110. When water stream 118 includes a base, at least a portion of the $CO_2$ gas from $CO_2$ gas stream 112 is converted to an HC03(-) ion. In certain embodiments, the pH of water stream 118 is controlled to avoid significant production of insoluble carbonate ion, such as, for example, below 9 pH. Without being bound by theory, HC03(-) is more soluble in water than $CO_2$, allowing more $CO_2$ to be captured per volume of water than were the base not present.

The $CO_2$ within gas stream 112 may be configured to be dissolved in the fluid within water stream 118 after being injected into wellbore 130, or the $CO_2$ may be dissolved within water stream 118 in a pipeline before being injected into wellbore 130. This may allow most of the $CO_2$ to be dissolved before being injected into wellbore 130. After absorption/adsorption or reaction in combination with absorption/adsorption, the $CO_2$ dissolved in water and/or converted to HC03(-) ions may be discharged from capture vessel 110 through $CO_2$ solution gas mixture stream 120. In certain embodiments the flow rate of $CO_2$ gas stream 112 may be matched to the desired rate of production of $CO_2$ dissolved in water and/or converted to HC03(-) ions. Thus, the $CO_2$ gas stream 112 may be increased, slowed, or halted to match the duty cycle of the source or to match the sequestration action of greenhouse gas sequestration medium 150. A percentage of the $CO_2$ within the solution gas mixture stream 120 may be between 3% and 15%, wherein the percentage of diluted $CO_2$ within the solution gas mixture stream 120 may be less than an amount that would cause a coal seam to swell. However, in other embodiments, percentage of the $CO_2$ within the solution gas mixture stream 120 may be up to 75% or as low as 0.1%. This may allow a concentration of the $CO_2$ within the solution gas mixture stream 120 to be less than 100%. This may allow the percentage of diluted $CO_2$ within the solution gas mixture stream 120 to be less than an amount that would cause a coal seam to swell. The amount of $CO_2$ within the solution gas mixture stream 120 might be subsaturated, saturated, or super saturated. The solution gas mixture stream 120 might be comprised of a single liquid phase formed of two separated components, water and $CO_2$, or two phases. For example, it may be comprised of a solution phase and a gas phase. The percentage of $CO_2$ within the solution gas mixture stream 120 that is absorbed by greenhouse gas sequestration medium 150 may be controlled by various factors.

In further embodiments, the percentage of $CO_2$ within the solution gas mixture stream ay be controlled by changing a location depth of tubing in a water column to control a minimum pressure of injected gas. Specifically, a compression pressure of the $CO_2$ within the solution gas mixture stream 120 establishes the partial pressure and thus concentration of the $CO_2$ within the solution gas mixture stream 120, wherein the compression pressure may be established based on a water head within the tubing. As a result, the tubing depth and water head controls a concentration of the $CO_2$ within the solution gas mixture stream 120.

When gas is being dissolved into the fluid a concentration of $CO_2$ within the solution gas mixture stream 120 may be controlled by increasing the compression pressure of the $CO_2$ within the solution gas mixture stream 120, which may increase the solubility of the $CO_2$ within the solution gas mixture stream 120. In cases with tubing with a water column with a static pressure, however moving a positioning of the tubing may change a pressure at which the gas is exiting the tubing to choose an exit pressure of the $CO_2$ leaving the tubing, wherein the pressure may be below the bubble point. To this end, adjusting the water head outside the tubing is used to control a pressure at which $CO_2$ enters the solution gas mixture stream 120. Additionally, the concentration of $CO_2$ within the solution gas mixture stream 120 may be controlled by adjusting the flow rate of $CO_2$ stream 112 or of the water stream 118. Furthermore, the rate that the $CO_2$ dissolves within the solution gas mixture stream 120 may be controlled by changing a shape and/or size of the $CO_2$ surface area with the water stream 118 by forming bubbles, nanobubbles, or other methods that increases the flow rate, buoyancy, or head space of the $CO_2$. Accordingly, there may be a plurality of ways to impact the amount of $CO_2$ gas that is dissolved in a particular unit volume of water and at the pressure at which the $CO_2$ gas is being dissolved in the water.

In one embodiment where $CO_2$ gas may be bubbling up a wellbore within the tubing, by increasing a rate of the water stream 118 may cause the $CO_2$ gas to dissolve within the water stream 118 or the $CO_2$ gas may not have sufficient time to dissolve and escape the water, which may require flowing $CO_2$ gas with the water stream 118 at a faster rate or further distances. Advantageously when coal is the sequestration medium 150, coal may accept both $CO_2$ in both the gas and fluid state.

$CO_2$ solution gas mixture stream 120 may be injected through wellbore 130 into greenhouse gas sequestration medium 150. Greenhouse gas sequestration medium 150 may be a subterranean formation that may adsorb/absorb $CO_2$. In some embodiments, $CO_2$ solution gas mixture stream 120 may be gravity fed through wellbore 130 and into greenhouse gas sequestration medium 150, thereby reducing energy input to deliver the $CO_2$ solution gas mixture stream 120 to greenhouse gas sequestration medium 150. In some embodiments, $CO_2$ solution gas mixture stream 120 may be produced from an adjoining coal seam or well using the pumping device in that coal seam or well. Furthermore, the water within $CO_2$ solution gas mixture stream 120 may act as a first filter for the $CO_2$ from $CO_2$ gas stream 112 before the gas interacts with gas sequestration medium 150. The coal within capture and the coal seam within greenhouse gas sequestration medium 150 may act as a second filter. Utilizing these two filters, the amount of time and money required to clean up $CO_2$ can be greatly reduced.

In some embodiments, $CO_2$ solution gas mixture stream 120 may be treated, in-situ in the subterranean formation, ex-situ outside the subterranean formation, or a mixture thereof to facilitate release of $CO_2$ from $CO_2$ solution gas mixture stream 120. Such treatments may include chemical treatments, such as adding an acid, for example, HCl, or $NaHCCb$, or materials containing carboxyl groups, and/or heat to decompose at least a portion of any bicarbonate ions that may have formed, or electrochemical treatments to oxidize the bicarbonate ions to $CO_2$. By treating $CO_2$ solution gas mixture stream 120, a larger amount of $CO_2$ per volume of water may be delivered to greenhouse gas sequestration medium 150 by forming the bicarbonate form of $CO_2$ as the intermediate form during transport but regenerating the $CO_2$ form at greenhouse gas sequestration medium 150. The acid solution may be balanced against the bicarbonate on a molar basis. Such a balance may be determined stoichiometrically or through lab testing. In another embodiment, a low pH aqueous solution (less than 7 pH, for example) may be used to facilitate release of the $CO_2$ from $CO_2$ solution gas mixture stream 120. As an example, greenhouse gas sequestration medium 150 may be flooded with the low pH aqueous solution and then $CO_2$ solution gas mixture stream 120 injected.

Release of the $CO_2$ from the $CO_2$ solution gas mixture stream 120 (hereinafter referred to as "$CO_2$ generation") may be facilitated at various points within the process, such as beneath the surface of the earth. In one embodiment, $CO_2$ generation is accomplished in a wellbore, such as, for example at a point near the perforations of the wellbore. Such a point may be advantageous in that mixing can occur more readily because of turbulent flow near the perforations of the wellbore. $CO_2$ generation may be easier to control and verify within the wellbore than at other positions below the earth's surface, as the $CO_2$ generation is at a position where sensors may be easily placed. In another embodiment, the $CO_2$ generation process is facilitated as a point away from the wellbore or between injectors into the formation.

In certain embodiments, greenhouse gas sequestration medium 150 may be a coal seam, wherein greenhouse gas sequestration medium 150 may include a plurality of coal seams at different depths within a single wellbore or multiple wellbores. In an embodiment, $CO_2$ solution gas mixture stream 120 may be injected into the coal seam and be used to recover methane from within the porous structure of the coal seam. Without being bound by theory, coal has a greater affinity for $CO_2$ than for methane. When water having $CO_2$ is injected into the coal seam, methane may be liberated and extracted. More specifically, when $CO_2$ solution gas mixture stream 120 is injected into greenhouse gas sequestration medium 150, the $CO_2$ is absorbed by the coal seam, pushing methane ahead within the fracture. The rate and length of the injection, and the location of the production wells, can be chosen in order to facilitate or eliminate the production of methane from the coal seam. In specific embodiments, appreciate production of methane from the coal seam may be eliminated altogether by halting the injection before the methane reaches a production well, thereby leaving room in the coal for the methane to continue to reside. Further, greenhouse gas sequestration medium 150 could be any target production zone, and the injected solution may be used to enhance recovery of a variety of hydrocarb such as enhanced oil recovery from a mudrock or sandstone reservoir.

In specific embodiments, an injection rate of the $CO_2$ within the solution gas mixture stream 120 may be based on an absorbing rate of $CO_2$ within greenhouse gas sequestration medium 150. Accordingly, if the diluted percentage of the $CO_2$ within the solution gas mixture stream 120 is known, then an injection rate of the $CO_2$ solution gas mixture stream 120 may be less than a flow rate that would cause the coal seam to swell.

In embodiments, a rate of absorption of $CO_2$ by the greenhouse gas sequestration medium 150 may be based on a surface area of the greenhouse gas sequestration medium 150. To increase the rate of absorption of the absorption of $CO_2$ the surface area of the greenhouse gas sequestration medium 150 may be increased. In implementations, to change the geometry and flow capacity of an existing well, a plurality of horizontal laterals may be drilled using tight radius drilling, water jetting, or mechanical drilling, or the geometry of a well completion may be changed using underreaming, lateral drilling techniques, mining techniques, enhancement techniques, and other techniques which increase the flow capacity surface area of the greenhouse gas sequestration medium 150. This may dramatically improve the flow rate capacity of the greenhouse gas sequestration medium 150 by increasing the surface area of the greenhouse gas sequestration medium 150, allowing substantially more $CO_2$ to be injected into the wellbore. Furthermore, by diluting the $CO_2$ within the solution gas mixture stream 120, the greenhouse gas sequestration medium 150 will not swell even with the increase in injection flow rate.

In some greenhouse gas sequestration medium 150, $CO_2$ may be strongly adsorbed/absorbed. For example, coal preferentially adsorbs/absorbs $CO_2$ over nitrogen and methane.

The nitrogen, methane, or other downhole gases may be pushed towards a collector the wellsite creating an episodic production stream from the nitrogen and/or methane, wherein the methane or nitrogen may be substantially pure. Thus, natural gas in coal will be produced by the adsorption/absorption of $CO_2$ into the coal, creating a production stream that may be sold or used for onsite power generation. For example, the production stream with substantially pure urethane may be utilized for on site, episodic power needs, such as bit-coin mining. Further, trace gases such as nitrogen will not interfere in the sequestration process, allowing the user to use low cost or free stripper, i.e., non-pure, forms of $CO_2$ as a feedstock, significantly reducing cost. In addition, by employing the natural adsorption/absorption mechanism of greenhouse gas sequestration medium 150, the $CO_2$ is sequestered in long term, as the $CO_2$ may be tightly held to greenhouse gas sequestration medium 150. When a base is used water stream 118, the salt of the base may be formed as $CO_2$ from the $HCO3(-)$ is adsorbed/absorbed into greenhouse gas sequestration medium 150.

In certain embodiments, after sequestration, water containing one or more salts and absorbed hydrocarbon gases, such as natural gas, is transported to the surface through wellbore 130 as produced water stream 160. Produced water stream 160 may be separated in separator 170 into gaseous hydrocarbon stream 180 and separated water stream 190. In certain embodiments, separator 170 is a flash separator. In certain embodiments, natural gas is separated from the produced water in the wellbore. Gaseous hydrocarbons such as natural gas in gaseous hydrocarbon stream 180 may be burned on site to power greenhouse gas capture system 105. $CO_2$ produced from the burning is captured and sequestered as described above. Excess power may be sold to the electrical grid. Separated water stream 190 may be desalinated or separated water stream 190 may be treated using the chloralkali process to regenerate water+base+acid (such as, for example, NaOH and HCl). The water may be reused in water stream 118.

When greenhouse gas sequestration medium 150 is full, i.e., greenhouse gas sequestration medium 150 no longer adsorbs/absorbs commercially reasonable amounts of $CO_2$, or as full as desired, greenhouse gas sequestration medium 150 may be capped with a water head. The pressure of the water on the subterranean formation may be maintained above the pressure of the $CO_2$ in greenhouse gas sequestration medium 150, effectively capping greenhouse gas sequestration medium 150 without the need for a cap rock. In embodiments, before injecting $CO_2$ solution gas mixture stream 120 within greenhouse gas sequestration medium 150, a natural pressure of the greenhouse gas sequestration medium 150 may be determined. After injecting $CO_2$ solution gas mixture stream 120 within greenhouse gas sequestration medium 150 a total pressure of the greenhouse gas sequestration medium 150 may be calculated, wherein the pressure of greenhouse gas sequestration medium 150 before the injection should be substantially similar to the pressure of greenhouse gas sequestration medium 150 after the injection of $CO_2$ solution gas mixture stream 120. This may be controlled by injecting more or less $CO_2$ solution gas mixture stream 120 within greenhouse gas sequestration medium 150 if necessary. This process of maintaining the total pressure of greenhouse gas sequestration medium 150 at or below the initial pressure of greenhouse gas sequestration medium 150 may protect and/or increase a stability of greenhouse gas sequestration medium 150 after the sequestering project.

In implementations, step rate testing or pressure testing for connectivity of fractures and wellbores within greenhouse gas sequestration medium 150 may be performed while cycling the injecting $CO_2$ solution gas mixture stream 120 within greenhouse gas sequestration medium 150. Specifically, the step rate testing may be performed before initially injecting $CO_2$ solution gas mixture stream 120 within greenhouse gas sequestration medium 150, between cycles of injecting $CO_2$ solution gas mixture stream 120 within greenhouse gas sequestration medium 150, and after competing injecting $CO_2$ solution gas mixture stream 120 within greenhouse gas sequestration medium 150. Furthermore, after injecting $CO_2$ solution gas mixture stream 120 within greenhouse gas sequestration medium 150, the wellbores may be monitored to determine changes of well performance at different rates or pressures for stress-sensitive reservoirs due to the changes of the $CO_2$ being absorbed within greenhouse gas sequestration medium 150 and methane being pushed forward. Using the information measured during the step rate tests, the direction or directions of the injection might be adjusted in order to increase or decrease the flow of the $CO_2$ solution gas mixture stream 120 through the greenhouse gas sequestration medium 150 in order to ensure the injection rate is as high as possible without causing breakthrough of $CO_2$ at the production well. Specifically, the $CO_2$ solution gas mixture stream 120 can be injected into the greenhouse gas sequestration medium 150 along a direction substantially parallel to the direction in which the greenhouse gas sequestration medium 150 shows high permeability in order to maximize the injection rate or along a direction substantially orthogonal to the direction in which the greenhouse gas sequestration medium 150 shows high permeability in order to reduce the injection rate and maximize the time over which the medium may absorb or adsorb the $CO_2$ from the $CO_2$ solution gas mixture stream 120.

Greenhouse gas sequestration system 100 may be monitored using Raman, gas, pressure, floe rate, and other sensors to optimize mass flows, match injection pace with sequestration pace, insure water head pressure remains above the pressure of the $CO_2$, and insure $CO_2$ remains where it is sequestered.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art may readily use the present disclosure as a basis for designing or modifying other processes and structures for carrying out the same purposes and/or achieving the same advantages of the embodiments introduced herein. One of ordinary skill in the art may make various changes, substitutions, and alterations without departing from the spirit and scope of the present disclosure.

Figure 2:
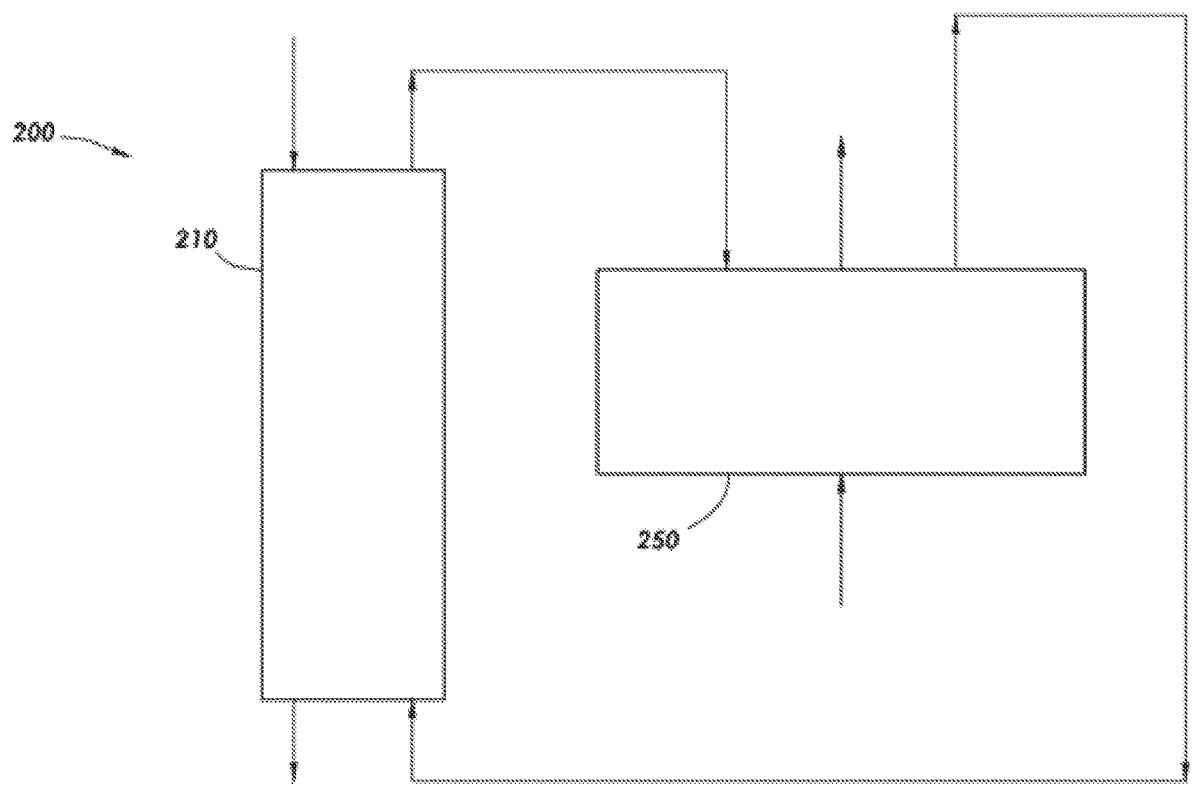
FIG. 2 is a block diagram of an absorption system for greenhouse gases consistent with at least one embodiment of the present disclosure.

A greenhouse gas capture system may be absorption system 200, as shown in FIG. 2. In an absorption system, a liquid sorbent may be used to separate the greenhouse gas from air in absorption unit 210. FIG. 2 depicts a counter current absorption unit, but such an example is non limiting. Examples of liquid sorbents include, but are not limited to, water, monoethanolamine, diethanolamine, and water containing sodium or potassium hydroxide. After absorption, the liquid sorbent with adsorbed greenhouse gas may be sent to desorption unit 250. In desorption unit 250, the greenhouse gas may be separated from the liquid sorbent, such as through a membrane separator, and the greenhouse gas dissolved in a liquid medium, such as water. Alternatively, a chemical reaction could be used, such as changing the liquid sorbent pH to the dissolved greenhouse gas to a liquid medium for subsequent sequestration. In embodiments, atmospheric gas may be directly absorbed by a liquid medium, and once the liquid medium is loaded with a desired amount of atmospheric gas, the liquid medium may be pumped or otherwise moved downhole.

Figure 3:
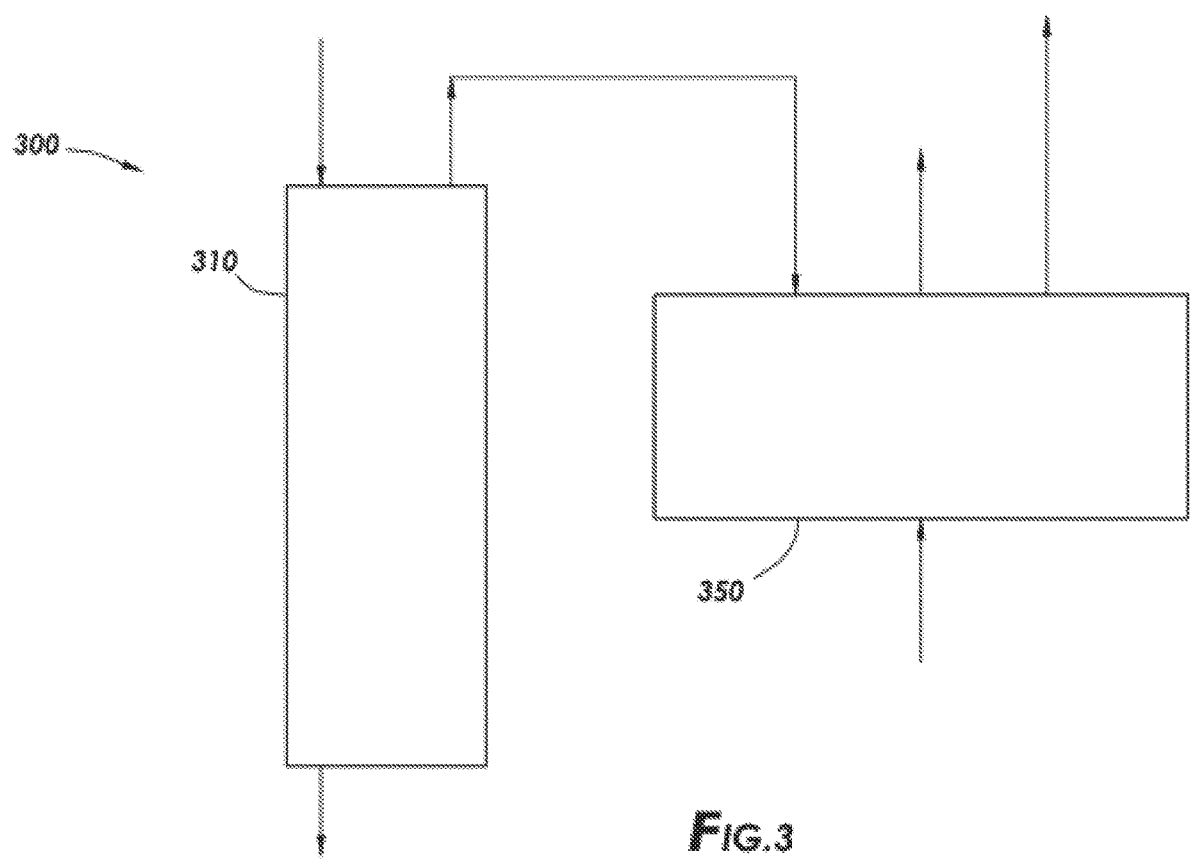
FIG. 3 is a block diagram of an absorption system for greenhouse gases consistent with at least one embodiment of the present disclosure.

A greenhouse capture system may be adsorption system 300, as shown in FIG. 3. In adsorption system 300, adsorption unit 310 containing a solid sorbent may be used to bind the greenhouse gas. Example solid sorbents include molecular sieves, activated carbon, zeolites, calcium oxides, hydrotalcites and lithium zirconate. The adsorbed greenhouse gas may be recovered in swing reactor 350, such as by swinging the pressure or temperature of the solid sorbent/adsorbed greenhouse gas. The desorbed greenhouse gas may be dissolved in a liquid medium, such as water.

Figure 4:
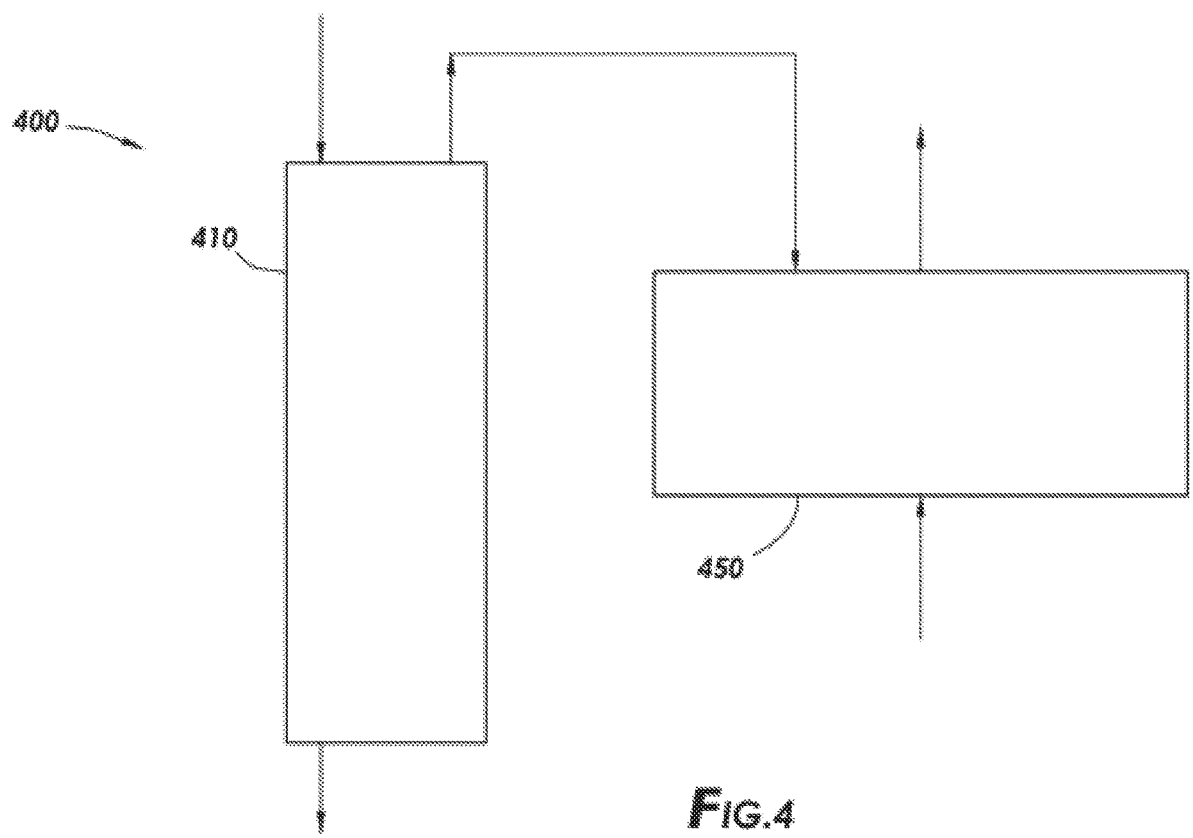
FIG. 4 is a block diagram for a membrane separation system consistent with at least one embodiment of the present disclosure.

A greenhouse capture system may be membrane separation system 400, as shown in FIG. 4. Membrane separation system 400 may include membrane separator 410, which may include a membrane. The membrane may allow greenhouse gases to pass through, while excluding other air gases. In certain embodiments, the membrane may allow certain greenhouse gases, such as carbon dioxide through, while excluding other greenhouse gases. Greenhouse gases separated by, the membrane in membrane separator 410 may be mixed with a liquid medium, such as water, in water/greenhouse gas mixer 450.

Figure 5:
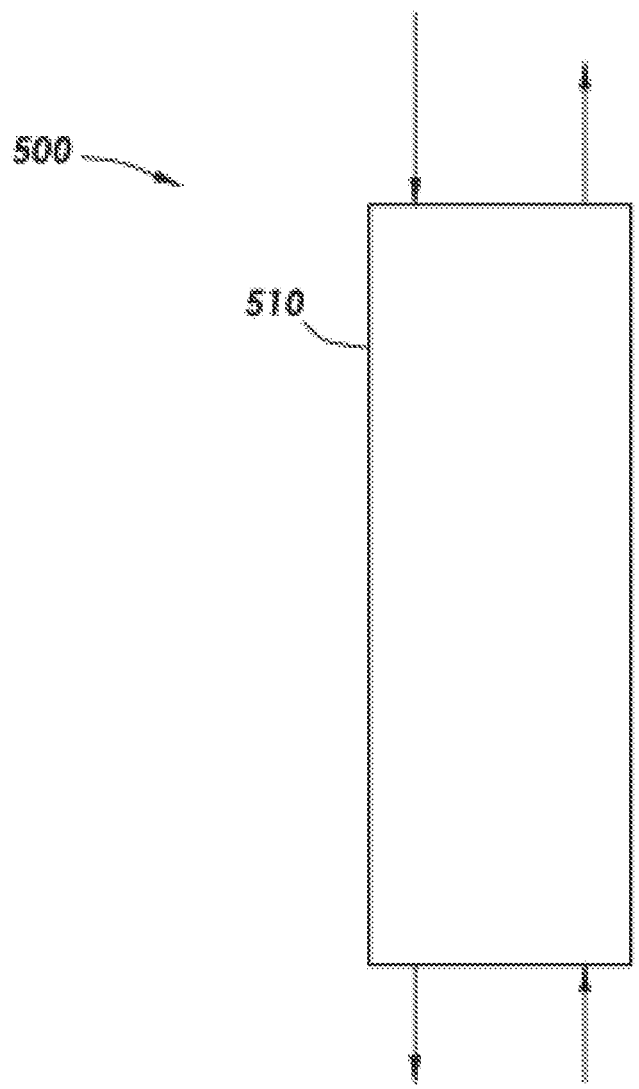
FIG. 5 is a block diagram for a hydrate-based greenhouse gas separator consistent with at least one embodiment of the present disclosure.

A greenhouse gas separator may be hydrate-based greenhouse gas separator 500, as shown in FIG. 5, such as when the greenhouse gas is carbon dioxide. Air is exposed to water in high-pressure hydrate former 510 to form hydrates. During formation of hydrates, carbon dioxide is captured in the cages of the hydrates, thereby separating the carbon dioxide from the other gases in air. Without being bound by theory, carbon dioxide may form hydrates more easily than with other gases in air.

In still another option, then sequestration medium could be a depleted formation of either coal or other stratigraphy which has had significant water, and therefore pressure, removed. The aqueous medium may then act to refill the depleted zone for long term sequestration. Alternatively, upon recharging the depleted zone, the previous embodiment could be followed to now produce methane or other hydrocarbon through the same cycle.

Figure 6:
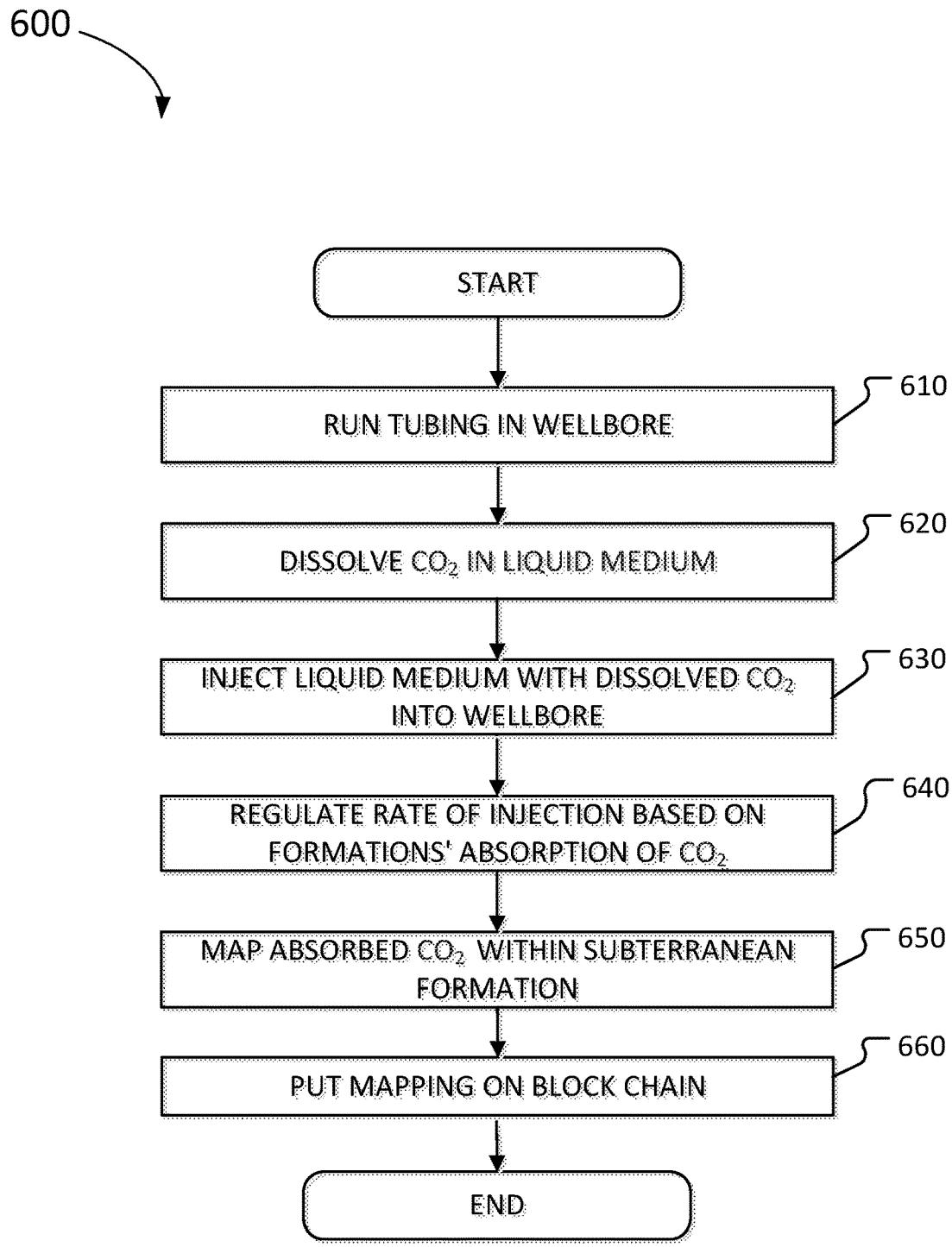
FIG. 6 depicts a method for controlling sequestering carbon within a coal seam, according to an embodiment.

FIG. 6 depicts a method 600 for controlling sequestering carbon within a coal seam, according to an embodiment. The operations of the method depicted in FIG. 6 are intended to be illustrative. In some embodiments, the method may be accomplished with one or more additional operations not described, and/or without one or more of the operations discussed. Additionally, the order in which the operations of the method are illustrated in FIG. 6 and described below is not intended to be limiting.

At operation 610, tubing may be run in a wellbore with at least one coal seam to a desired depth. The tubing may be configured to allow for water including dissolved $CO_2$ to be emitted into the coal seam.

At operation 620, $CO_2$ may be dissolved within water at a desired concentration, which may be between one and fifteen percent. In embodiments, the amount of $CO_2$ may be dissolved within water or medium may be any percentage less than 100%. The desired concentration of the dissolved $CO_2$ may allow for sufficient amounts of $CO_2$ to be absorbed by the coal seam at a desired pressure without causing the coal seam to swell and damaging the subterranean formation.

At operation 630, the water with dissolved $CO_2$ may be injected into the coal seam. This may cause the $CO_2$ to be absorbed within the coal seam, and radially push methane away from a face of a coal seam. In embodiments, the coal seam may absorb the $CO_2$ in a radial plane from the face of the coal seam until the coal seam is saturated with $CO_2$. Sequentially, portions of the coal seam that are positioned radially further away from the face of the coal seam may begin to absorb the dissolved $CO_2$.

At operation 640, a rate of the injected water with the dissolved $CO_2$ may be regulated to control a composition of the absorbed $CO_2$ within the coal seam. The rate may be controlled based on a desired absorption of the dissolved $CO_2$ within the water by the coal seam. An amount of $CO_2$ that a coal seam may absorb at first distance from an injection site or the face of the fracture may be based on a partial pressure of the $CO_2$ within the injected water and the concentration of dissolved $CO_2$ within the water. In embodiments, when dissolved $CO_2$ is injected into the coal seam, the $CO_2$ will be radially absorbed by the coal seam. When the $CO_2$ is radially absorbed by the coal seam, methane may be pushed radially outward within the coal seam. If the partial pressure of the $CO_2$ within the injected water and the concentration of the dissolved $CO_2$ within the water remain constant, as the coal seam becomes saturated with $CO_2$ the coal seam may uniformly and radially incrementally absorb the dissolved $CO_2$. However, if the partial pressure of the injected water or the concentration of the dissolved $CO_2$ is changed, than the coal seam may not uniformly absorb the $CO_2$. This may cause situations where different radial distances from the face of the fracture may have different compositions and saturation levels of $CO_2$, or where the levels of $CO_2$ within the coal seam are changed over time.

At operation 650, a mapping of absorbed $CO_2$ within the coal seam may be created. In embodiments, because the concentration of the dissolved $CO_2$ within the water is known and the partial pressure of the water is known, quantities and locations of dissolved $CO_2$ within the coal seam may be determined. This mapping may be verified through various techniques, such as Raman spectroscopy and gas desorption from core samples of the coal seam.

At operation 660, the mapping of the absorbed $CO_2$ within the coal seam may be put on a block chain, or any other type of record that are securely linked together using cryptology, along with the UPS locations, partial pressure of injection, concentration of dissolved $CO_2$ within the injected water, saturation levels of $CO_2$ within the coal seam and other parameters. This may enable third parties to purchase carbon credits based on the sequestered $CO_2$ within the coal seams.

Figure 7:
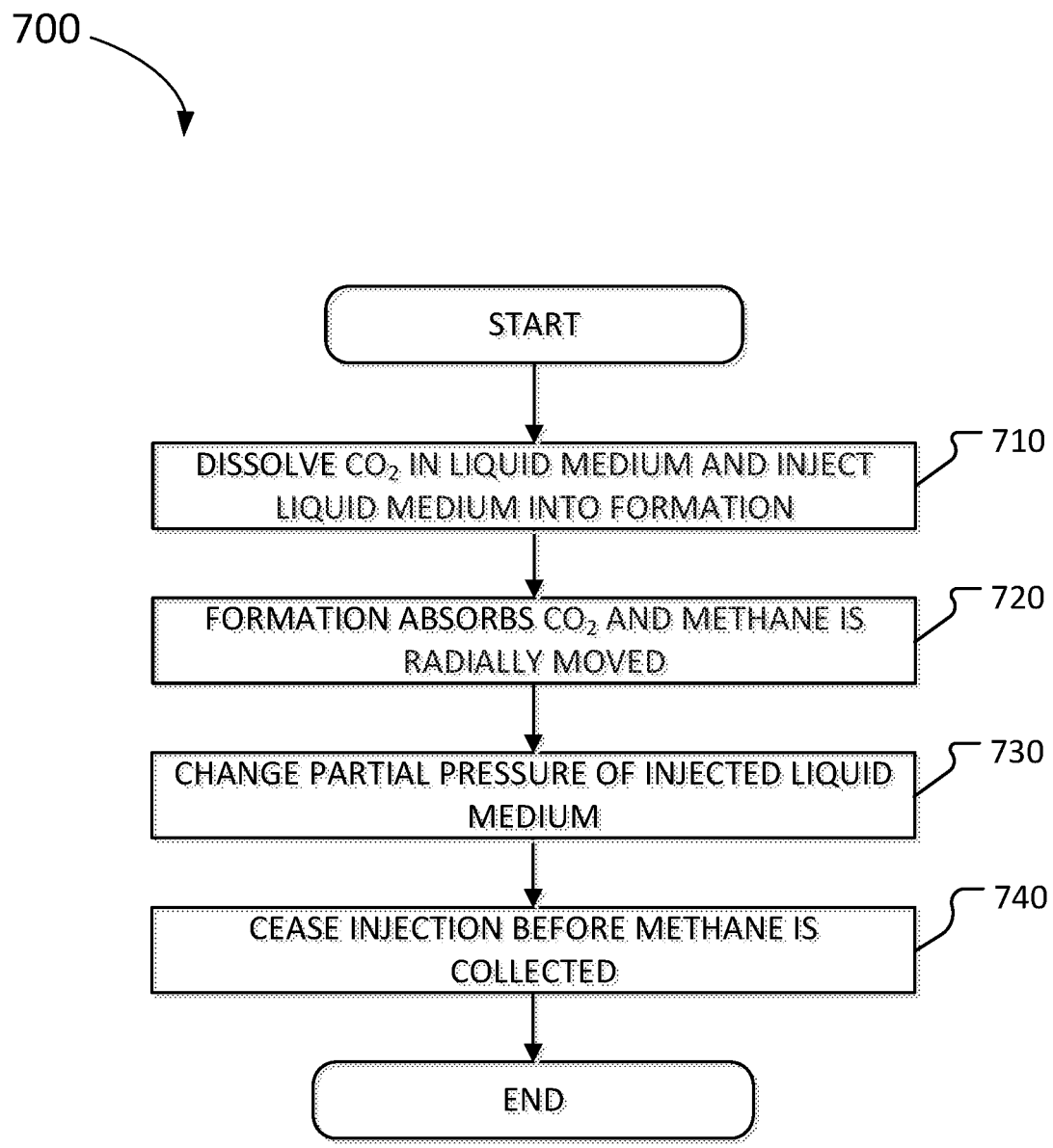
FIG. 7 depicts a method for determining connectivity of a wellsite by sequestering carbon within a coal seam, according to an embodiment.

FIG. 7 depicts a method 700 for determining connectivity of a wellsite by sequestering carbon within a coal seam, according to an embodiment. The operations of the method depicted in FIG. 7 are intended to be illustrative. In some embodiments, the method may be accomplished with one or more additional operations not described, and/or without one or more of the operations discussed. Additionally, the order in which the operations of the method are illustrated in FIG. 7 and described below is not intended to be limiting.

At operation 710, water, or other fluids, with dissolved $CO_2$ may be injected into a coal seam. This may cause the $CO_2$ to be absorbed within the coal seam.

At operation 720, as $CO_2$ is absorbed by the coal seam, methane that was previously embedded within the coal seam may be radially pushed away from a face of a coal seam. The methane may be pushed away from the face of the coal seam at a rate that is proportional to the rate of injection of the water with the dissolved $CO_2$ and the concentration of the dissolved $CO_2$ within the water. This pushing of the methane may be completed simultaneously for a plurality of different wellbores simultaneously. In other words, the $CO_2$ may be loaded into the coal seam closest to the wellbore first, and push methane out in front of it to load coal further away from the wellbore. This will continue until the methane is pushed to a location where it can escape through a production well, at which point it can be collected at a surface. In embodiments, different pumps may be utilized simultaneously to inject water with dissolved $CO_2$ into the different wellbores, wherein the partial pressure of the injected water with the dissolved $CO_2$ may be the same or different at each wellbore, and the concentration of dissolved $CO_2$ within the water may be the same or different at each wellbore.

At operation 730, the partial pressure at different wellbores may be changed to control the locations of absorbed $CO_2$ within the coal seams, wherein increasing the partial pressure may radially move the absorbed $CO_2$ radially further away from the face of the coal seam. Consequently, this may move the methane previously embedded within the coal seams radially further away from the face of the corresponding fracture. The partial pressures may be controlled based on a location of each of the wellbore, such that methane is pushed towards a single collector. Furthermore, by controlling the directions that methane is pushed via the dissolved $CO_2$ in the water, locations of collectors may also be changed to more advantageous or efficient locations.

At operation 740, the injection of water with dissolved $CO_2$ may cease before the methane reaches the collector, such that the methane previously embedded within the $CO_2$ may never be produced. This may enable the sequestering of dissolved $CO_2$ without producing any gases. In alternative embodiments, the injection of water with dissolved $CO_2$ may continue until the methane associated with coal seams in different wellbores is pushed and produced by a single collector.

Figure 8:
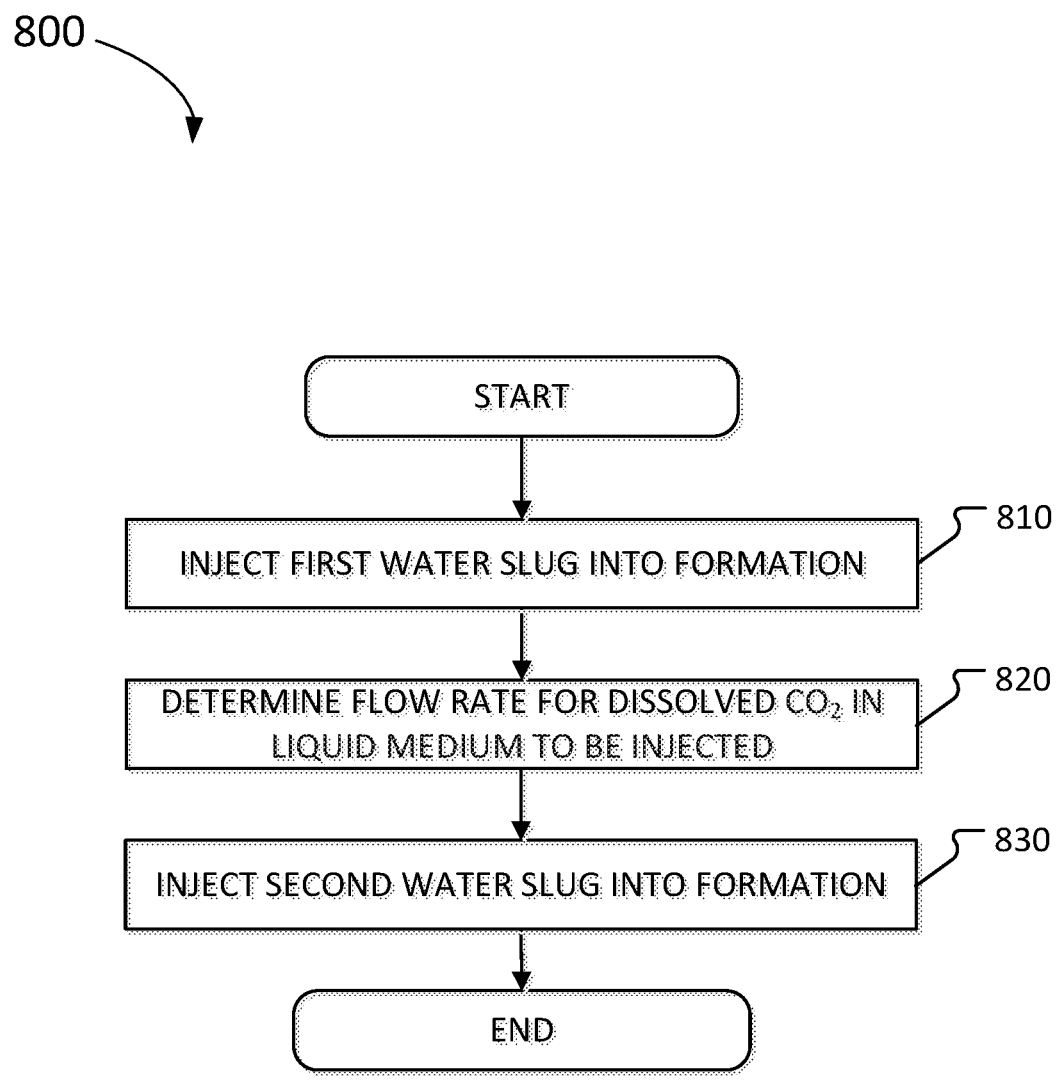
FIG. 8 depicts a method for monitoring connectivity, determine time frames it takes for water with dissolved $CO_2$ to move from an injector to a collector, and measuring absorbing rates of the $CO_2$, according to an embodiment.

FIG. 8 depicts a method 800 for monitoring connectivity, determine time frames it takes for water with dissolved $CO_2$ to move from an injector to a collector, and measuring absorbing rates of the $CO_2$, according to an embodiment. The operations of the method depicted in FIG. 8 are intended to be illustrative. In some embodiments, the method may be accomplished with one or more additional operations not described, and/or without one or more of the operations discussed. Additionally, the order in which the operations of the method are illustrated in FIG. 8 and described below is not intended to be limiting.

At operation 810, a first water slug, being a non-chemical tracer, pure water, water with a distinct pH, etc. may be injected into the wellbore through an injector, flow through the subterranean formations, and be received by a collector at a collector. Due to identifiable properties of the first water slug, a time required for the first water slug to travel from the injector to the collector may be determined.

At operation 820, a flow rate for water with dissolved $CO_2$ may be determined based on the time required for the water slug to travel from the injector to the collector. In embodiments, it may be desirable to match the flow rate of the water with the dissolved $CO_2$ to an absorption rate of the $CO_2$ by the coal seam. Thus, the flow rate of the water with dissolved $CO_2$ may be increased, slowed, or halted to match the duty cycle of the source or to match the sequestration action of the coal seam.

At operation 830, a second water slug may be injected into the wellbore through the injector flow through the subterranean formations, and be received by a collector at a collector. A time required for the second water slug to travel from the injector to the collector may be determined. The times required for the two water slugs to travel from the injector to the collector may be compared to determine if they are different, and if they have impacted the connectivity of the subterranean formations. Furthermore, while the second water slug is moving through the subterranean formations, chemicals may flow ahead of the second water slug, which may be collected at the collector to be examined.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art will also understand that such equivalent constructions do not depart from the scope of the present disclosure and that they may make various changes, substitutions, and alterations to the devices disclosed herein without departing from the scope of the present disclosure.

What is claimed is:

1. A method comprising:
   forming a mixture stream by dissolving carbon dioxide within water;
   injecting the mixture stream into a solid subterranean formation being a coal seam, wherein carbon dioxide is diluted to a concentration that does not cause the solid subterranean formation to swell, and the solid subterranean formation preferentially absorbs CO2 gas over nitrogen and methane; wherein the methane within the solid subterranean formation moves along a pressure gradient across multiple axis of a corresponding solid subterranean formation;
   injecting water into a capture vessel;
   moving a location of methane within the solid subterranean formation to a desired position based on a composition of the solid subterranean formation and the concentration of the carbon dioxide mixed with the water in the capture vessel;
   sequestering downhole carbon dioxide within connected fractures without swelling the coal seam.

2. The method of claim 1, further comprising:
   diluting the concentration of the carbon dioxide within the mixture stream to match an absorption rate of the carbon dioxide within the solid subterranean formation.

3. The method of claim 1, further comprising:
   controlling the concentration of the carbon dioxide within the mixture stream;
   controlling a partial pressure that the mixture stream is injected into the solid subterranean formation;
   controlling a composition of the solid subterranean formation based on the controlled concentration of the carbon dioxide within the mixture stream and the controlling a partial pressure that the mixture stream is injected into the solid subterranean formation.

4. The method of claim 3, wherein the methane is never produced at the collector.

5. The method of claim 3, further comprising:
   forming a mapping of the solid subterranean formation, the mapping including locations with corresponding amounts of the absorbed carbon dioxide within the solid subterranean formation.

6. The method of claim 5, further comprising:

forming a block chain ledger including the mapping with the locations with corresponding amounts of the absorbed carbon dioxide within the solid subterranean formation, the concentration of the carbon dioxide within the mixture stream that the mixture stream was injected into the solid subterranean formation, and the partial pressure that the mixture stream was injected into the subterranean formation.

7. The method of claim 1, wherein the mixture stream includes nano bubbles to increase a surface area of the dissolved carbon dioxide within the water.

8. The method of claim 1, wherein the carbon dioxide is dissolved within the water before being injected into the solid subterranean formation, wherein the carbon dioxide is directly captured from atmospheric air by a water stream.

9. The method of claim 1, wherein the mixture stream is comprised of one to fifteen percent carbon dioxide.

10. The method of claim 1, further comprising:

performing tight radius drilling within the solid subterranean formation to increase an exposed surface area within the solid subterranean formation, wherein a rate of absorption of the carbon dioxide by the solid subterranean formation is dependent on the exposed surface area.

11. The method of claim 1, further comprising:

determining an initial natural pressure of the solid subterranean formation before injecting the mixture stream into the solid subterranean formation;

monitoring a total pressure of the solid subterranean formation while injecting the mixture stream into the solid subterranean formation;

maintaining the total pressure during injection at or below the initial natural pressure of the solid subterranean formation.

12. The method of claim 1, further comprising:

performing step rate tests to determine connectivity of fractures within the solid subterranean formation, wherein the step rate tests are performed before, during, or after the injecting the mixture stream into the solid subterranean formation.

13. The method of claim 1, further comprising:

injecting a first water slug with a unique identifier into the solid subterranean formation from an injector before injecting the mixture stream into the solid subterranean formation;

determining a first time period required for the first water slug to travel from the injector to collector;

controlling an injection rate of the mixture stream into the subterranean formation based on the first time period and a sequestration action of the solid subterranean formation, wherein the sequestration action is absorbing carbon dioxide.

14. The method of claim 1, wherein the water is obtained from another location in the coal seam or another coal seam of similar water quality in order to protect the water quality of the injection coal seam.

15. A method comprising:

dissolving carbon dioxide within water to form a solution gas mixture stream;

injecting the solution gas mixture stream into a plurality of solid subterranean formations, each of the plurality of solid subterranean formations including a coal seam, wherein a carbon dioxide is diluted to a concentration that does not cause the plurality of solid subterranean formations to swell;

moving, via the carbon dioxide within the solution gas mixture stream, methane from the solid subterranean formations towards a collector based on a composition of the solid subterranean formation and the concentration of the carbon dioxide mixed with the water in the capture vessel, and the solid subterranean formations preferentially absorb CO2 gas over nitrogen and methane, wherein the methane within the solid subterranean formation moves along a pressure gradient across multiple axis of a corresponding solid subterranean formation; and sequestering downhole carbon dioxide within connected fractures without swelling the coal seam.

16. The method of claim 15, further comprising:

determining a location of the collector based on a positioning of the plurality of solid subterranean formations, wherein the collector is configured to receive methane from each of the plurality of solid subterranean formations.

* * * * *